March 10, 1953  G. H. BENZON, JR  2,630,722
INDEXING DEVICE FOR MACHINE TOOLS
Filed June 7, 1949  7 Sheets-Sheet 1
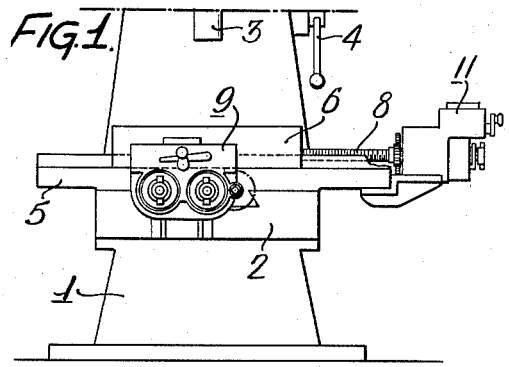
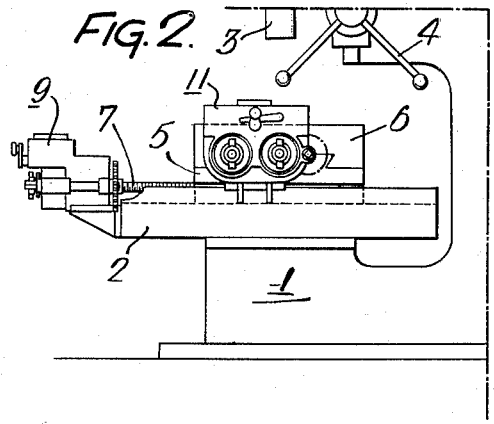
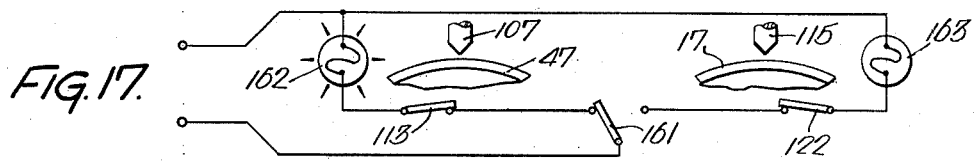
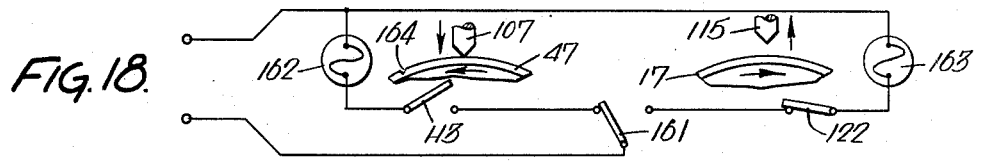
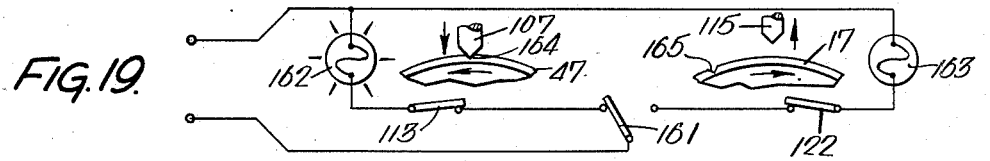
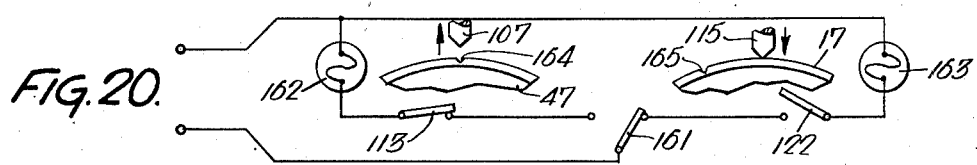
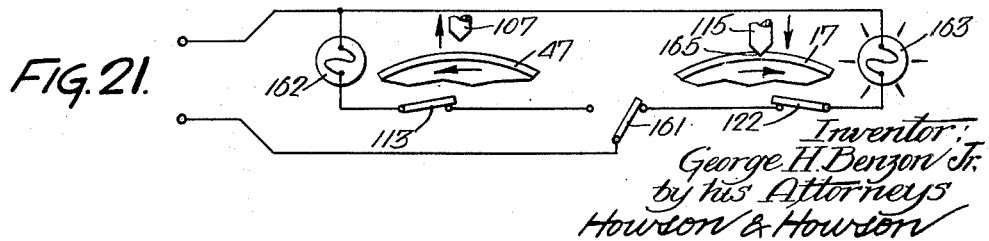

March 10, 1953     G. H. BENZON, JR     2,630,722
INDEXING DEVICE FOR MACHINE TOOLS
Filed June 7, 1949                                  7 Sheets-Sheet 2

Inventor
George H. Benzon Jr.
by his Attorneys
Howson &
Howson

March 10, 1953  G. H. BENZON, JR  2,630,722
INDEXING DEVICE FOR MACHINE TOOLS
Filed June 7, 1949  7 Sheets-Sheet 3

Inventor:
George H. Benzon Jr.
by his Attorneys
Howson & Howson

March 10, 1953 G. H. BENZON, JR 2,630,722
INDEXING DEVICE FOR MACHINE TOOLS
Filed June 7, 1949 7 Sheets-Sheet 4

Inventor:
George H. Benzon Jr.
by his Attorneys
Howson & Howson

March 10, 1953 G. H. BENZON, JR 2,630,722
INDEXING DEVICE FOR MACHINE TOOLS
Filed June 7, 1949 7 Sheets-Sheet 5
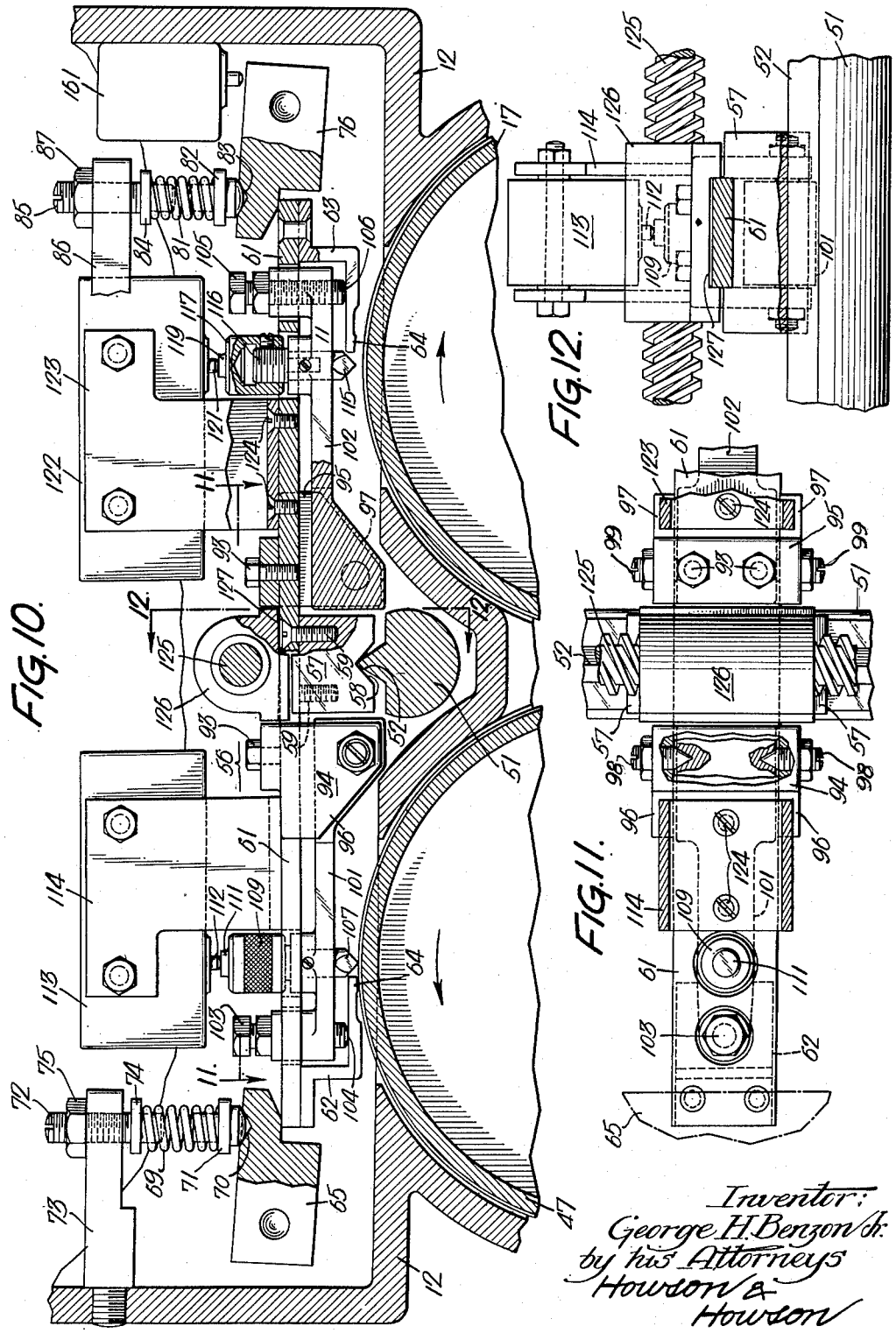
Inventor:
George H. Benzon Jr.
by his Attorneys
Howson &
Howson March 10, 1953 G. H. BENZON, JR 2,630,722
INDEXING DEVICE FOR MACHINE TOOLS
Filed June 7, 1949 7 Sheets-Sheet 6
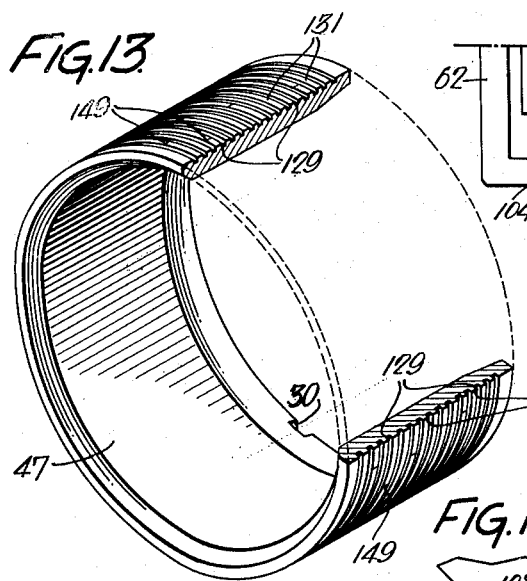
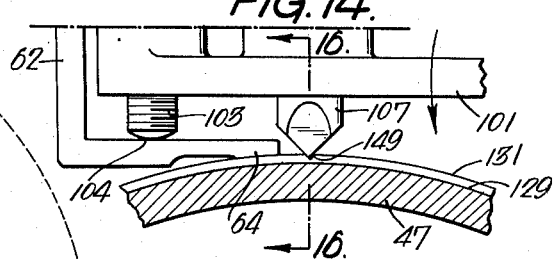
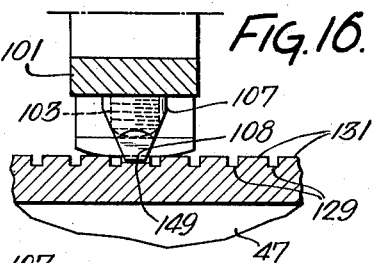
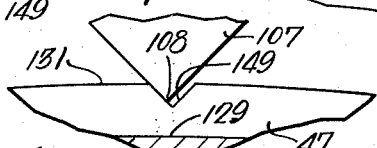
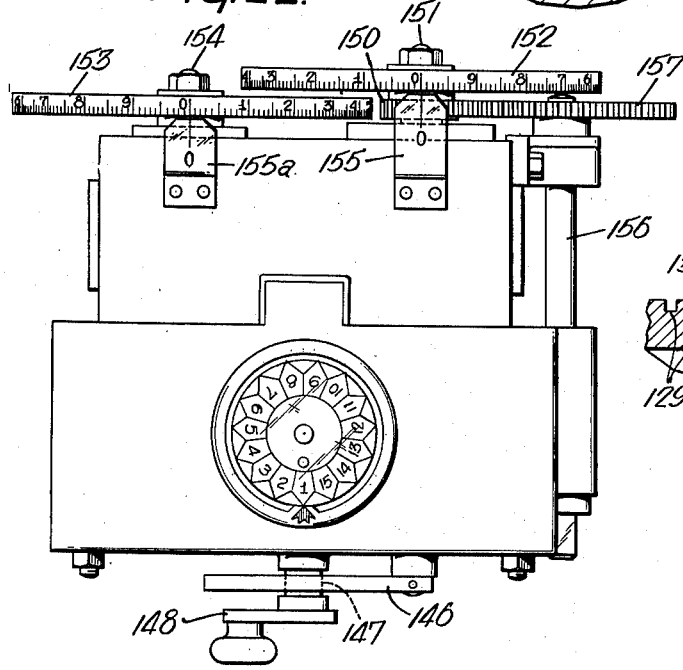
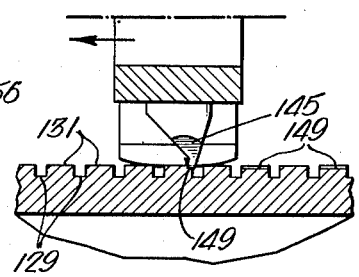
Inventor:
George H. Benzon Jr.
by his Attorneys
Howson & Howson

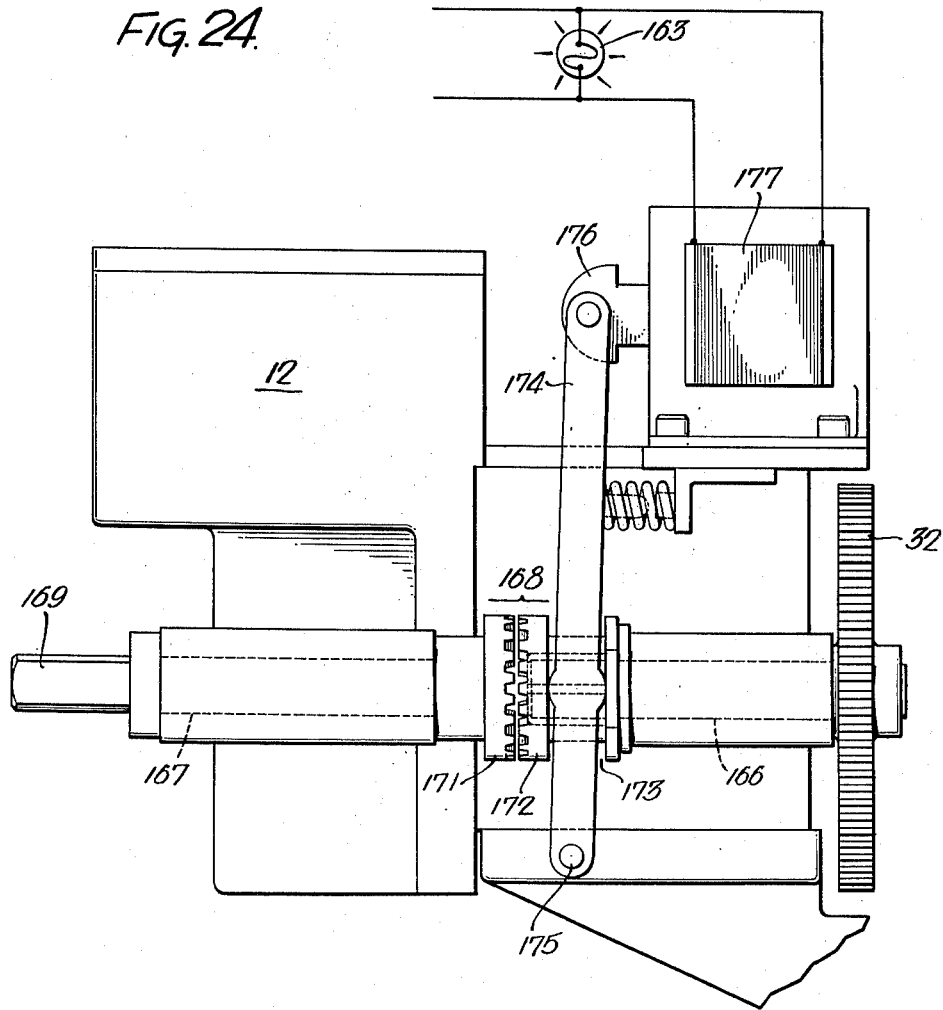

Patented Mar. 10, 1953

2,630,722

UNITED STATES PATENT OFFICE 2,630,722

INDEXING DEVICE FOR MACHINE TOOLS

George H. Benzon, Jr., Lansdale, Pa.

Application June 7, 1949, Serial No. 97,683

34 Claims. (Cl. 77—1)

The primary object of this invention is to provide a novel and highly efficient indexing device for machine tools by means of which the machine may be adjusted rapidly and precisely to a setting or succession of settings in each of which the work and the tool element which is to operate upon the work are relatively positioned for a predetermined separate operation.

Another object is to provide an indexing device of the stated type for reproducing a cycle of operations by means of preformed graphic charts or records so that either small or large lots of similar parts may be accurately machined without reference to dimensions or layouts.

Another object of the invention is to provide an indexing device of the stated character in the form of a compact and mechanically simple unit which may be readily incorporated in the machine tool without essential modification of the normal mechanism of the machine.

More specifically, an object of the invention is to provide a unitary device of the character described adapted for connection to the traverse mechanism through which the work and the tool element are brought into position for the desired machining operation or operations.

Still another object is to provide an indexing device of the general character set forth which utilizes pre-formed records as a medium for indicating the setting or settings of the machine which correspond to the respective operations to be performed upon the work.

A further object is to provide a device of the character set forth above which includes a mobile carrier for the said records together with means operatively associated with the carrier and adapted for actuation by a carrier-mounted record to indicate the setting or settings of the machine for the required operation or series of operations to be performed upon the work.

A still further object is to provide a device of the stated character wherein means is provided for operatively connecting the mobile carrier to the traverse mechanism of the machine for synchronized operation with the latter.

Still another object of the invention is to provide a record controlled indexing device of the character described including novel means for producing the said record or records for a desired operation or sequence of operations on any given work-piece at locations remote to the machine tool upon which the work is to be performed and in which the said indexing device is incorporated.

The invention resides further in certain novel mechanical and structural details of the indexing and record forming units hereinafter described and illustrated in the attached drawings, wherein:

Fig. 1 is an end elevational view of a boring mill equipped with indexing devices made in accordance with the invention;

Fig. 2 is a side elevational view of the boring mill;

Fig. 10 is an enlarged sectional view corresponding to the view of Fig. 9;

Fig. 11 is a sectional view on the line 11—11, Fig. 10;

Fig. 12 is a sectional view on the line 12—12, Fig. 10;

Fig. 13 is a sectional perspective view showing one of the indexing records;

Fig. 14 is an enlarged fragmentary sectional view showing a fragment of a record and the immediately associated elements of the indexing device;

Fig. 15 is a fragmentary enlargement of a portion of Fig. 14;

Fig. 16 is a sectional view on the line 16—16, Fig. 14;

Figure 5:
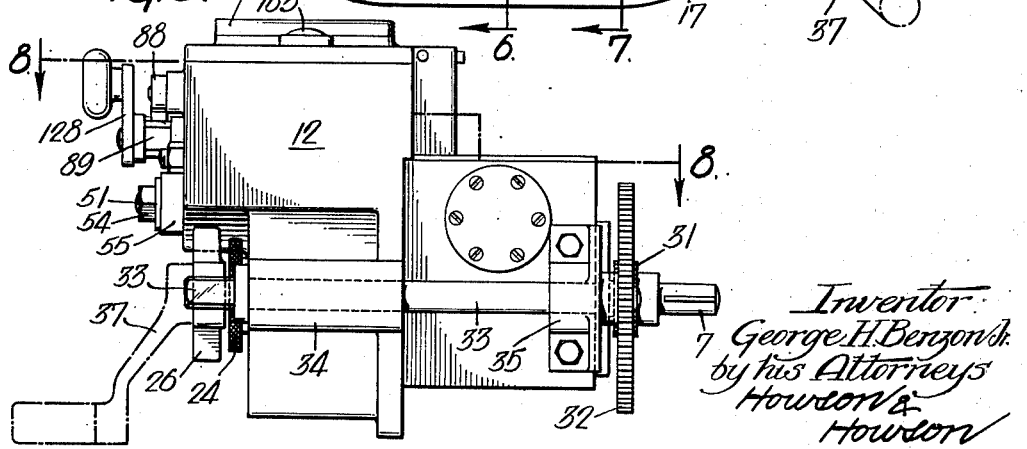
Fig. 5 is a side elevational view of the unit shown in Figs. 3 and 4.

Figs. 17 to 21 inclusive are diagrammatic views of the electrical signal system forming a part of the indexing device and illustrate the elements of the system and device in different operative positions corresponding to different phases of operation;

Fig. 22 is a top plan view of the record-marking unit of the device;

Fig. 23 is a fragmentary sectional view showing a detail of the record-marking device; and Fig. 24 is a side elevational view similar to Fig. 5 illustrating a modification within the scope of the invention.

With reference to Figs. 1 and 2 of the drawings, the boring mill therein illustrated comprises the usual base frame 1, table 2, and tool spindle 3, said spindle being vertically adjustable through the medium of suitable mechanism including an actuating handle 4. A carriage 5 is mounted upon the table 2 for movement in suitable guides longitudinally of the latter, and mounted on the carriage is a work support 6 which may be adjusted transversely of the table 2 in suitable guides on the carriage 5. Traverse movements of the carriage 5 longitudinally of the table 2 are effected by a traverse or lead screw 7; and the work support 6 is adjusted transversely on the carriage 5 through the medium of a traverse or lead screw 8. By adjustments of the carriage and work support, a work piece mounted on the support may be brought to the positions with respect to the axis of the spindle 3 in which the machining operation or operations may be performed by feeding the tool to the work.

Mounted at the front of the table 2 in operative association with the lead screw 7 is an indexing unit 9 which, as hereinafter set forth, determines the movements of the said screw required to bring the work into a predetermined position longitudinally of the table 2, relative to spindle 5. A similar unit 11 is mounted on the carriage 5 in association with the lead screw 8 and determines the movements of the screw to bring the work into a predetermined position transversely of the table with respect to the tool spindle. Since the units 9 and 11 are structurally and functionally identical, one only will be described in detail.

The mechanism of the indexing unit is well illustrated in Figs. 3 to 8 inclusive. The unit comprises a casing 12 within which is journaled a worm 13, see Fig. 7, this worm being connected by suitable means to the end of the lead screw 7. As shown the worm is journaled in anti-friction bearings 14—14. The worm shaft is extended, as indicated at 15, and this extension carries a flange 16 which in assembly forms an abutment for one end of a cylindrical record 17 supported as described below upon the shaft extension 15.

Figure 7:
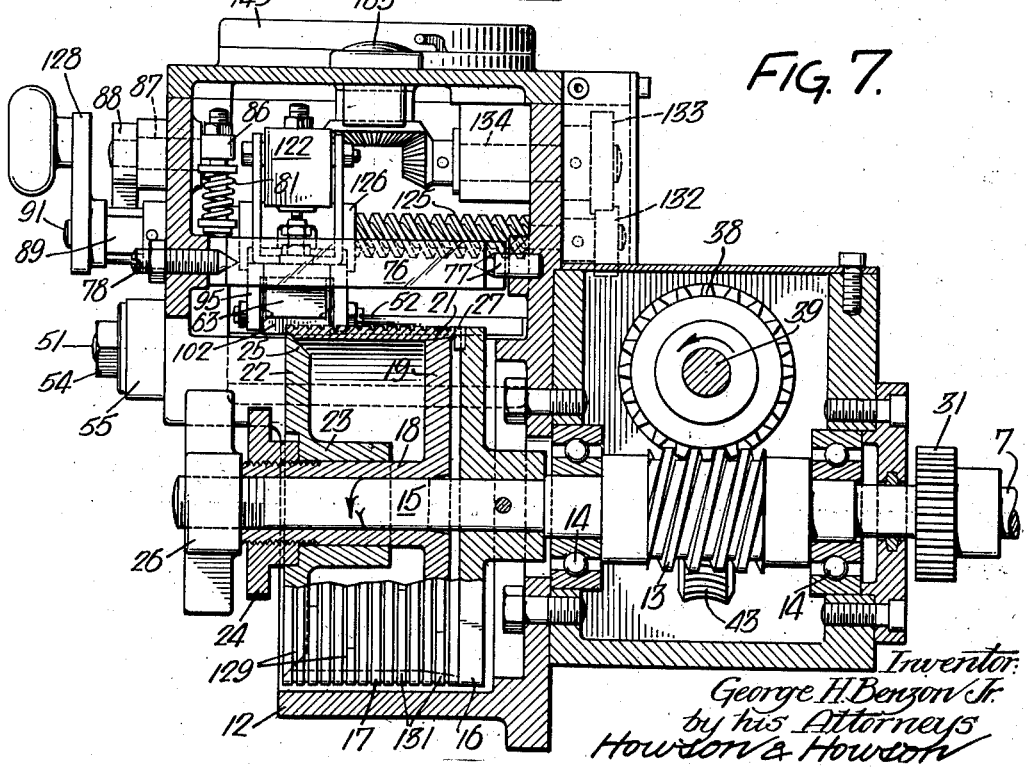
Fig. 7 is an enlarged sectional view on the line 7—7, Fig. 4.

In the present instance the record is supported upon a sleeve 18 the bore of which is accurately fitted to the shaft extension 15. This sleeve 18 has a radial flange 19 upon the periphery of which the one end of the record 17 is seated, as indicated at 21 in Fig. 7. The opposite end of the cylindrical record seats upon the periphery of a radial flange 22 on a second sleeve 23 which latter sleeve embraces and closely fits the sleeve 18. The sleeve 23 is held in place upon the sleeve 18 by means of a nut 24 having a knurled periphery, as shown in Fig. 7, and threaded on the outer end of the sleeve 18. It will be noted that the sleeves 18 and 23 with their respective radial record-supporting flanges 19 and 22, together with the nut 24, constitute a sub-assembly unit which may be applied to the projecting end of the shaft 15 and removed therefrom as required. In this sub-assembly the peripheral surface 21 of the flange 19 and the peripheral surface 25 of the flange 22 are beveled inwardly, the end portions of the cylindrical record 17 being correspondingly beveled so that in assembly the record is held securely in place upon the flanges and in effect is clamped between the beveled surfaces 21 and 25. It will be noted also that the inner edge of the record 17 projects somewhat beyond the flange 19 for abutment with the face of the flange 16.

The aforesaid sub-assembly is held in place upon the shaft 15 by means of a wing nut 26 which is threaded on the terminal end of the shaft as well shown in Fig. 7. This nut bears against the end of the sleeve 18 and clamps the assembly between itself and the flange 16. In the present instance the record is located in a predetermined position angularly with respect to the shaft 15 by means of a key 27 which projects from the flange 16 into a recess 30 (see Fig. 13) in the record. This device, however, is not essential to maintenance of the record in fixed position angularly with respect to the shaft 15, since this may be effectively accomplished by clamping action of the wing nut 26 and the frictional contact between the inner end of the cylindrical record and the face of the flange 16.

Figure 3:
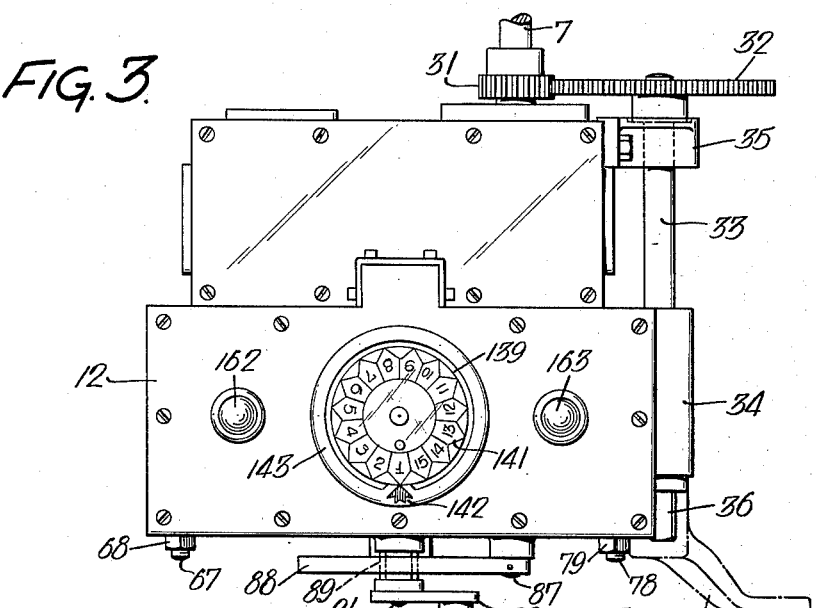
Fig. 3 is a top plan view of one of the indexing units.
Figure 8:
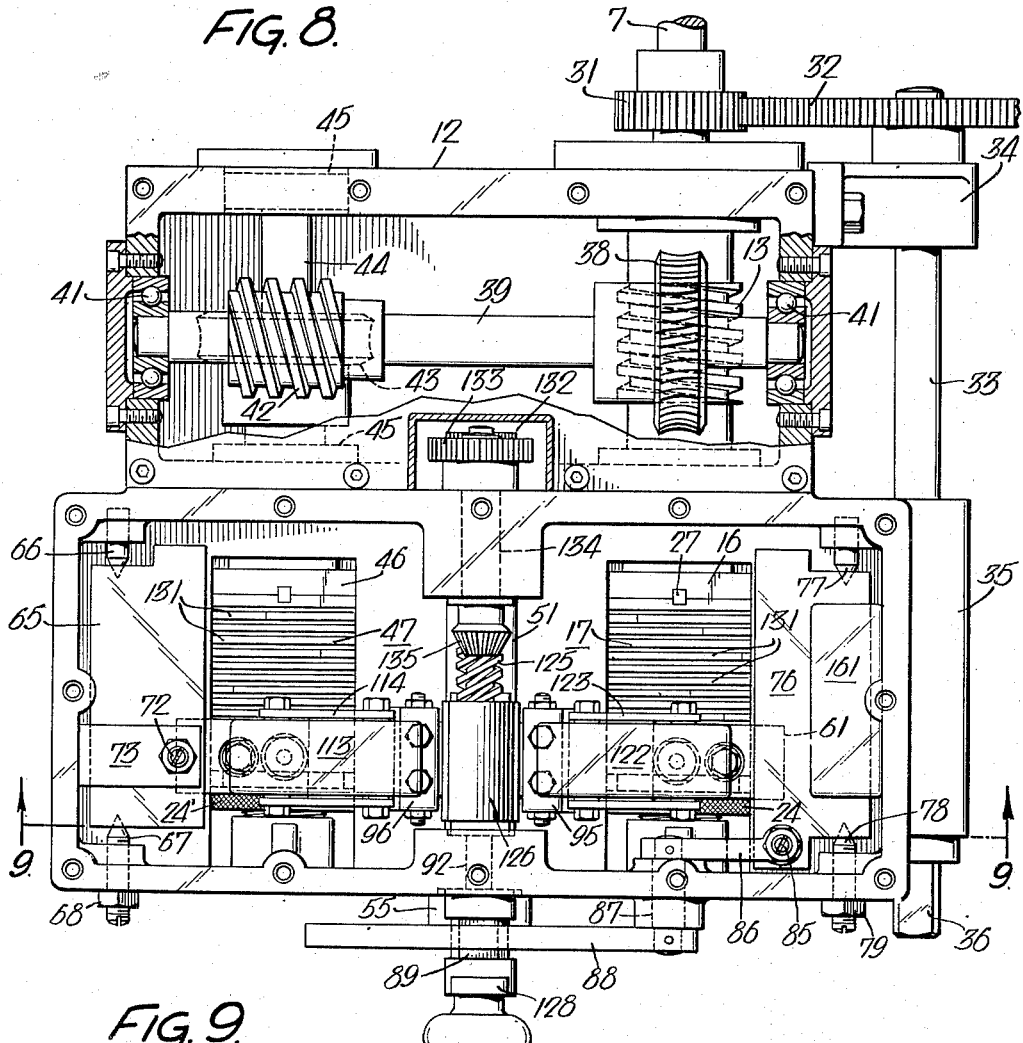
Fig. 8 is an enlarged sectional view on the line 8—8, Fig. 5.
Figure 9:
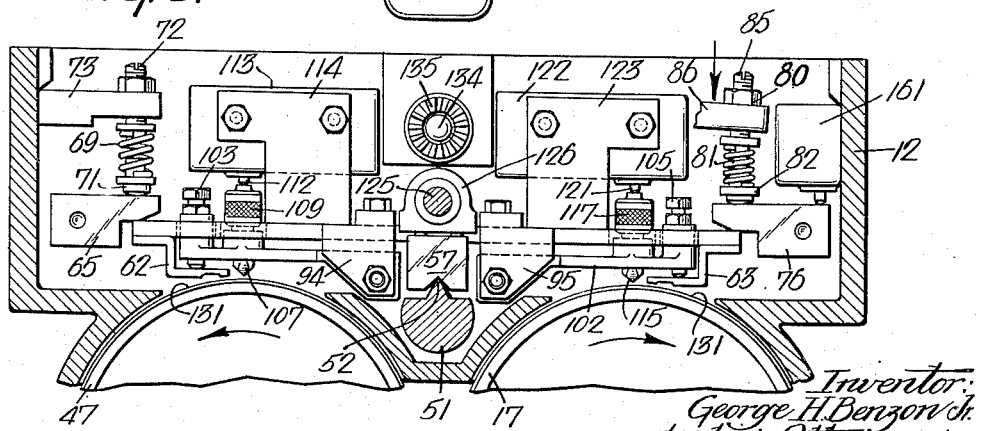
Fig. 9 is a fragmentary sectional view on the line 9—9, Fig. 8.

By reference more particularly to Figs. 3, 5 and 8, it will be noted that the shaft 7 carries at its rear end outside of the casing 12 a gear pinion 31. This pinion meshes with a gear 32 mounted on the rear end of a shaft 33 which extends forwardly at the side of the casing 12 parallel to the shaft 7 and is supported in suitable journals 34 and 35 on the casing. The forward end of this shaft which projects at the front of the casing 12 is rectangular in form and is adapted to enter the correspondingly shaped socket in a crank 37, as best shown in Fig. 3. The crank provides for manual rotation of the shaft 33 and, through the gear 32 and pinion 31, of the lead screw 7. With reference more particularly to Fig. 8, it will be noted that the worm 13 meshes with a worm wheel 38 on a transverse shaft 39 journaled in anti-friction bearings 41, 41 in the casing 12. At its other end the shaft 39 carries a worm 42 which engages a worm wheel 43 on a shaft 44, this latter shaft being journaled in anti-friction bearings 45, 45 in the casing 12. Shaft 44 extends forwardly in parallel relation to the shaft 15 and carries a flange 46 which corresponds to the flange 16 of the shaft 15. The forwardly projecting end of the shaft 44 is adapted to receive a record carrying sub-assembly similar to the assembly 18—23—24 described above, the record carried by this sub-assembly being shown at 47 in Fig. 8. Of this sub-assembly the nut which corresponds to the nut 24 is indicated in Fig. 8 by the numeral 24′, and the wing nut which holds the sub-assembly in place upon the shaft 44 and which corresponds to the wing nut 26 is indicated by the reference numeral 26′.

Figure 4:
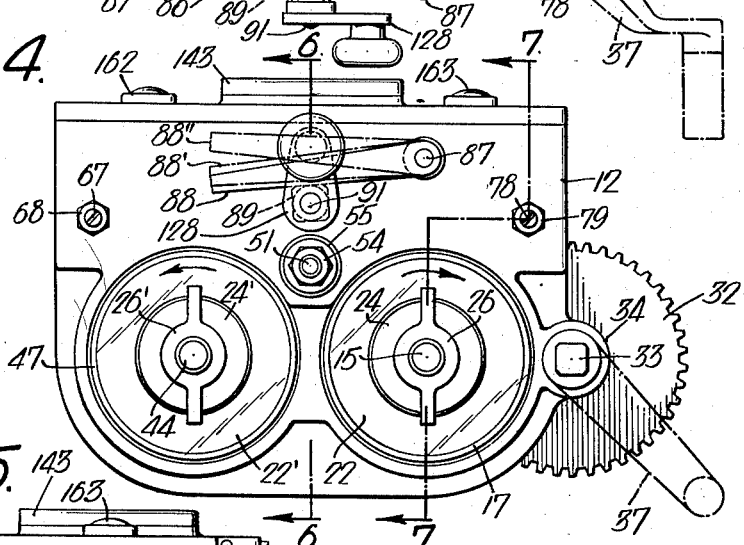
Fig. 4 is a front elevational view of the unit shown in Fig. 3.

It will be noted from Fig. 4 that the front of the casing 12 is open to permit insertion of the record-carrying sub-assemblies described above onto the ends of the shafts 15 and 44. In this figure the record-supporting flange which corresponds to the flange 22 of the first described record-carrying sub-assembly is indicated by the reference numeral 22′.

From the foregoing description it will be apparent that whereas the cylindrical record 17 will rotate with the lead screw 7 at the same rate of speed, the record 47 will rotate at a greatly reduced rate of speed. The ratio of speeds in the present instance is 100:1, i. e., for each one hundred rotations of the record 17 the record 47 will rotate once. If under these circumstances each one hundred rotations of the lead screw 7 will traverse the carriage 5 over a distance of say 20″, then it would be apparent that for each inch of traverse movement the record 47 will make 1/20 of a revolution.

Mounted in the upper part of the casing 12 is a bar 51 which is formed at the top with a knife edge 52. The bar 51 has a front end portion 53 of reduced diameter which projects through the front wall of the casing and is threaded for reception of a retaining nut 54. Keyed to the projecting end of the shaft is a sleeve 55 by means of which, when the nut 54 is loosened, the bar 51 may be adjusted about its axis for minute transverse adjustment of the knife edge 52. Normally, and when the nut 54 is tightened, the sleeve 55 and the bar 51 will be clamped solidly in the casing.

Supported on the knife edge 52 as a fulcrum is a lever assembly indicated generally by the reference numeral 56 and best shown in Fig. 10. This lever assembly comprises a central member 57 which seats upon the knife edge 52 as a pivot and which has a recess 58 for reception of said edge. To this block-like member 57 is secured, by means of screws 59, a transverse bar 61 which extends to each side of the fulcrum bar 51 and over the respective record supporting devices described above. Secured in a depending position to each end of the bar 61 is an L-shaped element, 62 and 63 respectively, the extremities 64 of which are formed as shoes and adapted to ride on the surfaces of the records, 17 or 47 as the case may be, under conditions hereinafter described. The assembly consisting of the member 57 and bar 61 and the fulcrum bar 51 are arranged with respect to the records so that one only of the members 62 and 63 may come into contact with the associated record at one time. This is shown in Fig. 10 wherein the aforesaid lever assembly is tilted to the left so that the shoe 64 of the member 62 contacts the surface of the underlying record 47 whereas the shoe 64 of the member 63 at the opposite end of the assembly is elevated above the surface of the record 17. When the lever assembly is in a horizontal or neutral position the members 62 and 63 will be clear of the respective associated records 17 and 47.

The bar 61 is engaged at one end by a lever 65 which, as best shown in Fig. 8, is pivotally supported in the casing upon points 66 and 67, the latter point being threaded into the front wall of the casing for adjustment purposes and being normally locked in adjusted position by a nut 68. The inner end of the lever 65 which overlies the end of the bar 61 is pressed downwardly upon the bar by a coil spring 69, see Fig. 10, which is confined between a spring retaining button 71, which seats in a recess 70 in the upper surface of the lever 65, and the lower end of a member 72 threaded into an arm 73 which is anchored in and projects from a wall of the casing. The member 72 has a collar 74 which forms a seat for the upper end of the spring 69; and a nut 75 serves to lock the screw 72 in place in the supporting arm 73. After release of the nut 75, the screw 72 may be adjusted in the arm 73 to regulate the pressure of the spring 69 upon the lever 65.

A corresponding lever 76 engages the opposite end of the bar 61, this lever, as best illustrated in Fig. 8, being pivotally supported in the casing by the points 77 and 78, the latter point being threaded into the front wall of the casing and being normally locked in place by nut 79. The lever 76 is pressed downwardly upon the bar 61 by a spring 81 which is confined between a button 82 seated in a recess 83 in the upper surface of the lever 76 and a collar 84 on a screw 85 which is threaded into the end of an arm 86 and which is normally locked in position in the arm by lock nut 80. In this instance the arm 86 is secured to the inner end of a shaft 87 which is journaled in the front wall of the casing 12, as best shown in Fig. 8, the outer end of the shaft 87 having attached thereto an arm 88 the function of which will be hereinafter described.

Figure 6:
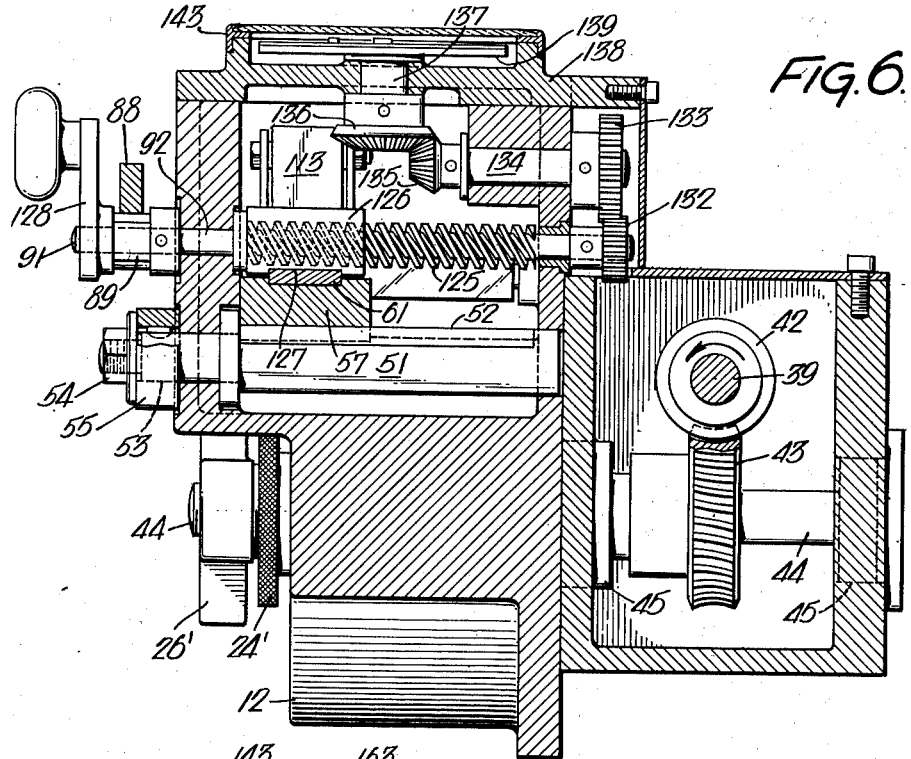
Fig. 6 is an enlarged sectional view on the line 6—6, Fig. 4.

Normally the spring 69 will exert a greater pressure on the bar 61 than the spring 81 so that the member 62 will seat upon the surface of the record 47 and the member 63 at the other end of the bar 61 will be elevated as shown in Fig. 10. Under these circumstances the arm 88 will occupy the position in which it is shown in full lines in Figs. 4 and 7, wherein it rests upon a cam 89 secured to the forwardly projecting end 91 of a screw shaft 92, said shaft being journaled in the casing as shown in Fig. 6 and directly overlying and paralleling the fulcrum bar 51. When the arm 88 is slightly elevated to the position shown in the broken lines at 88' in Fig. 4 the spring 81 will be compressed and its pressure increased to the point where it balances the pressure of the spring 69 whereby the bar 61 of the lever assembly 56 will assume a position wherein both of the shoes 64 of the members 62 and 63 will be clear of the respective records 47 and 17. When the lever 88 is elevated to the position 88'' in Fig. 4 the pressure of the spring 81 will be increased to the point where it exceeds the pressure of the spring 69 whereupon the right-hand end of the lever assembly 56 (as viewed in Fig. 10) will be depressed to an extent bringing the shoe 64 of the member 63 into contact with the surface of the record 17.

Secured to the bar 61 by means of screws 93, 93 at the opposite sides respectively of the block 57 is a pair of members 94 and 95. Each of these members has at the opposite sides thereof depending ears 96, 96 and 97, 97 respectively, which extend downwardly at opposite sides of the bar, and which carry screws 98, 98 and 99, 99, the screws of the respective pairs being aligned axially and having tapered inner ends which enter recesses in the opposite sides of levers 101 and 102 and thereby pivotally connect the levers to the bar 61, said levers extending outwardly under the opposite ends of the bar as shown in Figs. 10 and 11. The outer end of the lever 101 carries a set screw 103, the lower end of which will normally seat upon the upper surface of the member 62 as indicated at 104. A corresponding screw 105 is carried at the outer end of lever arm 102 and the lower end of the screw 105 will normally seat upon the upper surface of the member 63 as indicated at 106. Secured in the arm 101 is a pin 107 the lower end of which is shaped as a knife edge for line contact with the surface of the record 47. The knife edged form of the lower end of the pin 107 is best shown at 108 in Fig. 16. The pin 107 extends vertically and through the arm 101 and has threaded on the upper end thereof an element 109. The upper end 111 of the element 109 is adapted for engagement with the actuating button 112 of a microswitch 113, this switch being supported on a bracket 114 secured to the top of the bar 61. A pin 115 similar to the pin 107 is mounted in the arm 102 for engagement with the surface of the record 17, the upper end of this pin being threaded as shown at 116 for reception of an internally threaded element 117 which corresponds to the element 109 of the pin 107. The element 117, like the element 109, is locked in adjusted position on the threaded top of the pin 115 by means of a set screw 118. The element 117 is formed at the top as indicated at 119 for engagement with the actuating button 121 of a microswitch 122, this switch being mounted in a bracket 123 corresponding to the bracket 114 and similarly secured by screws 124 to the top of the bar 61.

The screw 103 is adjusted so that when the member 62 engages the surface of the record 47 and the lower terminal knife edge of the pin 107 also bears upon the surface of the record 47, the lower end of the screw 104 will be slightly elevated above the opposed surface of the member 62. Under these conditions the lever 101 will be supported by the pin 107 which bears upon the surface of the record and the element 109 at the upper end of the pin will under these conditions be adjusted so that the tip 111 of that element will be in engagement with and will support the button 112 so as to maintain the microswitch 113 in open condition. Under these conditions closing of the microswitch 113 will result if lower knife edge terminal end of the pin 107 enters a recess in the surface of the record. It will be apparent that irregularities in the contour of the record will not affect the microswitch by reason of the fact that such irregularities acting through the member 62 and its shoe 64 will cause movements of the bar 61 and therefore of the body of the microswitch 113 corresponding to the movements of the lever 101 resulting from the same irregularities.

The shaft 92, see Fig. 6, and its screw 125, as previously stated, directly overlies and parallels the fulcrum bar 51. Connected to the screw 125 is a follower nut 126 having in its under side a recess 127 which receives the bar 61. The opposite walls of the recess 127 closely engage the opposite sides of the bar 61 so that any movement of the nut 126 resulting from rotation of the screw 125 will necessarily be transmitted to the bar 61 and through the bar to the lever assembly 56 so that this entire assembly will be moved along the fulcrum bar 51. Such rotation of the screw 125 may be effected manually through manipulation of a crank 128 on the forward end of the shaft 92. By thus moving the lever assembly 56 the pins 107 and 115 may be brought into position for engagement with different axially spaced portions of the records 47 and 17. As shown in Fig. 13 the records are formed with a series of circumferential grooves 129 in the outer cylindrical surface thereof which divide the cylindrical surface into a series of circumferential lands 131, and it is apparent that the aforedescribed adjustment of the lever assembly 56 provides for bringing the pins 107 and 115 into position for engagement with these individual lands.

It will be noted that the initial movement of the crank 128 in rotating the screw 125 for the purpose of traversing the lever assembly as described above, will elevate the arm 88 through action of the cam 89 and will thereby rock the lever assembly 56 on its fulcrum 52 and against the pressure of the spring 69, as previously described, to a position wherein both of the shoes 64 and of the pins 107 and 115 are elevated from the surfaces of the records, thus leaving the said assembly 56 free for the traverse movement and preventing undesired marking of the faces of the records during such traverse.

At the rear end of the screw 125 the shaft 92 carries a gear pinion 132. This pinion meshes with a gear 133 on a jack shaft 134 journaled in the casing 12 above the shaft 92, the forward end of the shaft 134 carrying a bevel pinion 135 which meshes with a bevel gear 136 on the lower end of a vertical shaft 137 which is journaled in the cover plate 138 of the casing 12.

The shaft 137 carries at its upper end a dial 139, see Figs. 3 and 6, having at the periphery thereof a circumferential series of index marks 141 which, as the dial is rotated, register with a fixed index point 142 on a ring 143 secured to the cover plate 138. The index marks 141 correspond in number to the lands 131 of the records 47 and 17, and since the movement of the dial is necessarily synchronized with the movement of the follower nut 126 the dial affords an indication of the position of the lever assembly 56 and of the pins 107 and 115 with respect to the records and the particular lands of the records with which the said pins may at the moment register.

In conjunction with the devices described above, the invention contemplates a record marking unit of the character shown in Fig. 22. This unit is essentially the same mechanically and functionally as the units 9 and 11 described above, with the exceptions that the switches 113 and 122 are absent and the pins 107 and 115 are replaced by scribing elements of the character shown at 145 in Fig. 23. The cam 89 is also deleted so that the lever 146, which corresponds to the lever 88 of the unit 9, rests normally on a cylindrical surface 147 which supports the lever in a position corresponding to that in which the lever 88 is shown in full lines in Fig. 4. In this position the left hand scribing element 145 will be in operative engagement with the surface of underlying record so that traverse movement of the element 145 resulting from manipulation of the crank 148 (corresponding to crank 128 of unit 9) will cause the scribe to make a superficial incision or scratch 149, see Figs. 15, 16 and 23, extending in axial direction across the particular land 131 of the record with which the scribing element may be in contact. The depth of the scratch may be effectively regulated by adjustment of the screws (not shown) which correspond to the screws 103 and 105 of the unit 9 described above.

In the marking unit shown in Fig. 22, the shaft 151, which in the unit 9 corresponds to the worm shaft connected to the lead screw 7, carries a graduated cylindrical dial 152; and a corresponding dial 153 is carried at the rear end of the shaft 154, which corresponds to the shaft 44 of the unit 9 and which in this case is extended through the rear wall of the casing. The graduations of the dials register with fixed index markings on elements 155 and 152a respectively secured to the casing. The shaft 151 may be rotated through a pinion 150 on the shaft, a manually rotatable shaft 156, and a gear 157 on the latter shaft which meshes with the pinion 150. The shafts 151 and 154 are geared together in the same manner as the shafts 7 and 44 of the unit 9 and rotate at the same relative speeds.

In the operation of the devices described above, let it be assumed that a particular work piece requiring a plurality of drilled apertures be mounted on the work support 6 in predetermined position, say with one side edge thereof parallel to the direction of traverse of the support and with a given point on the work piece aligned with the axis of the spindle 3. Let it be assumed also that, starting from this point as a datum, the work piece must be traversed both longitudinally and transversely of the table or bed 2 in order to bring the center on which a first of the required apertures is to be drilled into alignment with the spindle axis, the extent of both of these traverse movements or ordinates being measureable on the layout drawings of the work.

Two of the record blanks described above are now placed in the marking unit and the crank 148 adjusted to bring the scribing tools to a position overlying the innermost of the lands 131 of the blanks. During this movement the lever 146 may be elevated so as to bring the lever assembly to a neutral position wherein both scribing tools are elevated above the surfaces of the record blanks. This neutral position of the lever 146 will correspond to the position 88' of the lever 88 of the operating unit 9 described above, see Fig. 4. With the dials 152 and 153 at the zero settings and the lever 146 still maintained in the neutral position, the shaft 156 is now turned until the length of one of the said ordinates is indicated within one division of the scale 153. At this point the lever 146 is released and will then drop to its seat upon the cylindrical support 147 which will have the effect of bringing the proximate scribing tool i. e., the tool which overlies the shaft 154 into engagement with the inner land 131 of the record blank supported on the latter shaft. The crank 148 is now turned to an extent traversing the scribing tool across the full width of the land of the record blank which it contacts with the result that a shallow incision or scratch is made upon the record.

With the lever 146 again elevated to neutral position the shaft 156 is again turned in the same direction until the full length of the ordinate is indicated on the dial 152 at which point the lever 146 is elevated to a position corresponding to the position 88" of the lever 88 in the aforedescribed operating unit, which has the effect of bringing the scribing tool which overlies the shaft 151 into engagement with the rearmost land 131 of the record blank associated with that shaft. The crank 148 is now turned to an extent traversing the scribing tool across the full width of the land which it contacts to thereby make a superficial incision or scratch upon that land.

With reference to the dials 152 and 153, it is to be noted that the shafts 151 and 154 which carry these dials are connected so as to rotate together at relative speeds corresponding to the relative speeds of the shafts 7 and 44 of the operating unit 9 previously described. It was stated in regard to that unit that the ratio of movement between the shafts 7 and 44 was 100:1 and that the various transmission elements were associated with the lead screw 7, that one full rotation of the shaft 44 corresponded to a traverse movement of the carriage 5 of 20". Accordingly, a complete rotation of the shaft 154 of the marking unit would correspond also to a carriage movement of 20", and since the dial 153 in the present instance is divided circumferentially into twenty main divisions, each of which is subdivided into ten subdivisions, it is evident that each main division of the dial 153 will correspond to a 1" movement of the carriage and each of the subdivisions to a carriage movement of $\frac{1}{10}$ of an inch.

The dial 152, as previously stated, turns one hundred times to each full rotation of the dial 153, so that each full rotation of the dial 152 corresponds to a movement of the carriage of $\frac{1}{5}$ of an inch. In the present instance the dial 152 is divided circumferentially into twenty parts, each of which therefore represents a movement of the carriage of $\frac{1}{100}$ of an inch; and each of the main divisions of the dial is subdivided into ten parts so that each of the subdivisions represents a carriage movement of $\frac{1}{1000}$ of an inch. For convenience, the dial 152 is divided into two sections each embracing 180° of circumference with the members of the main divisions extending from 0 to 10. Thus, each half revolution of the dial 152 corresponds to $\frac{1}{10}$ of an inch of carriage travel, as also does each subdivision of the dial 153, and the primary divisions in each half of the dial 152, numbered 1 to 10, will thus serve in effect to divide into tenths each of the dial 153 subdivisions.

The mark on the record blank associated with the shaft 154 formed, as described above, will be removed from the zero starting position to an extent corresponding to the linear length of the one ordinate of the movement of the work piece, referred to above, minus $\frac{1}{10}$ of an inch or less. The subsequent additional movement as measured on the dial 152 will complete the full ordinate.

After the marking of the innermost land of the two record blanks as described above, the crank 148 may be traversed, the lever 146 being held in neutral position, to bring the scribing tools into position for engagement with the next adjoining land 131 of the record blanks and, after returning the blanks to the original zero setting or using the position of the first operation as a datum, the shaft 156 is again operated to move the dials 152 and 153 to an extent corresponding to the traverse movements of the work required to bring the center point for the second operation into alignment with the axis of the tool spindle. The second land of the record blanks are marked in accordance with the same procedure described above first to produce a mark on the record blank associated with the shaft 154 corresponding to the ordinate within $\frac{1}{10}$ of an inch and a subsequent marking on the record blank associated with the shaft 151 to complete the ordinate within $\frac{1}{1000}$ of an inch. The ordinates for all of the separate drilling operations may, in this manner, be marked on successive lands of the record blanks.

The marked records are then removed and are replaced by a second set of record blanks which are marked in like manner in accordance with the lengths of other ordinates from the datum position corresponding to the transverse traverse movements required to bring the work into the positions for the several operations.

The two sets of records thus produced may now be placed in the operating units 9 and 11 previously described, the work piece being brought by traverse of the carriage 5 and work support 6 to a position wherein the datum point on the work piece from which the records were produced is in alignment with the axis of the spindle 3. With the records in the same positions which they initially occupied in the marking unit when the dials were at zero setting and with the lever assembly 56 located so that the pins 107 and 115 are in position to engage the innermost lands of the records, the lead screws 7 and 8 may now be turned to bring the work into position for the first operation. When the lead screw 7 has traversed the carriage 5 to a position within $\frac{1}{10}$ of an inch of the full ordinate, the pin 107 will ride into the scribed mark of the record 47 with the result that the micro switch 113 is closed to thereby actuate a signal circuit advising the operator that the work had been traversed through the one ordinate of the movement to within $\frac{1}{10}$ of an inch of the desired position. The operator then elevates the lever 88 to the position indicated at 88" in Fig. 4 with the result that the pin 115 is brought on to the rearmost land of the record 17. Additional traverse movement will eventually cause the pin 115 to enter the marking on the record 17, formed as described above, which will indicate through actuation of the micro switch 22 and the associated signal circuit that the one ordinate of the traverse movement has been completed to an accuracy of 1/1000 of an inch. Should the operator have turned the record 117 so that the marking passed beyond the point 115, as indicated by the fact that the signal is interrupted, he will turn the traverse screw in the opposite direction to bring the point 115 to the opposite side of the mark and will then traverse in the original direction slowly until the signal again indicates that the full ordinate movement has been completed.

A corresponding traverse is now made through the lead screw 8. The operating unit 11 indicating, as described above, when this traverse movement has been completed to an accuracy of at least 1/1000 of an inch. The two ordinates of the traverse movement having thus been completed, the work piece is in position for its first operation. When this operation has been completed the lever assembly 56 may be traversed sufficiently to bring the pointers 107 and 115 into position for engagement with the next adjoining lands of the records which will operate as described above to indicate to the operator when the work is in position for the second operation.

The signaling circuits are illustrated in Figs. 17 to 21 inclusive. Fig. 17 shows the points 107 and 115 elevated from the respective records and both of the micro switches 113 and 122 closed, which will be the condition of the switches when the points are clear of the records. The switch 161 is a switch associated with the device, including the lever 88, by means of which the lever assembly 56 is tilted to bring one or the other of the pointers 107 or 115 individually into contact with its associated record or both to the neutral position. The switch 161 is so related to the lever 88 that when the lever is in the full line position shown in Fig. 4, or in the position 88', the switch arm will occupy the position shown in Fig. 17 wherein, the micro switch 113 being closed, the signal lamp 162 will be energized. A second signal lamp 163 will be disconnected from the energy source. Fig. 18 shows the condition of the signal circuit when the pointer 107 is riding on the surface of the record 47, in this position the switch 113 is open and, as set forth above, the switch 161 will be in the position illustrated. The pointer 115 being elevated from the surface of the record 17 the associated micro switch 122 will be closed, but due to the position of the switch 161 the lamp 163 will be disconnected from the source of energy.

When, under these conditions, and as a result of the movement of the records, the point 107 enters a recess 164 in the surface of the record 47, the associated micro switch 113 will be closed, as shown in Fig. 19 so that the signal lamp 162 will be energized.

At this point in the operation, as described above, the operator shifts the lever 88 to the position 88'', Fig. 4, so as to bring the pointer 115 onto its record 17 and to elevate the pointer 107 from contact with the record 47. This moves the switch 161 to the position shown in Fig. 20, and when subsequently the pointer 115 enters a recess 165 in the record 17, thereby closes the micro switch 122, the signal lamp 163 associated with the record 17 will be energized to indicate to the operator that the pointer has entered the recess 165 and that the work piece is in position, as regards one ordinate of movement, for the initial operation.

By reference to Figs. 14 and 15, it will be noted that the extent of the movement of the pointer 107 below the surface of the record when entering one of the recesses 149 is limited by the contact of the shoe 64 with the surface of the record and contact of the set screw 104 with the element 62 on which the shoe 64 is formed. The operation therefore is independent of the actual depth of the recess 149. It will be apparent however that arriving at the ultimate position of the record with respect to the point 107 and in order to avoid minor variations due to excessive width of the recess 149 the final position should be approached always from the same direction. In other words, if the record is moved beyond the position wherein the point enters the recess it should be reversed to carry the recess back beyond the point and the direction of movement again reversed until the point again enters the recess.

It will be apparent that the device is subject to considerable modification in detail, without departure from the invention, as defined in the appended claims. It is not essential, for example, that the indexing device be operatively connected to the lead screws of the traverse mechanism of the machine to which the device may be applied as the movement of the records could be synchronized with the traverse movements of the work piece in other ways. It is apparent also that in tools wherein the work and cutting elements are brought into position by traversing the tool support instead of the work the indexing units would in that case be associated with the tool traversing mechanism instead of with the work traverse mechanism as described above. Similarly, the traverse might be effected in part by movement of the work and in part by movement of the tool spindle, in which case at least one indexing device would be associated with each of the traversing mechanisms. It will be apparent also that the switches 113 and 122 or equivalent electrical devices may be used to operate control devices for the machine instead of the signal lamps described above, and that the device may thus constitute a medium for automatic control and operation of the machine if desired. One such control device is illustrated by way of example in Fig. 24, wherein the elements of mechanism, in so far as they correspond entirely to those shown in the preceeding drawings and described above, are identified by the same reference numerals used in Fig. 5, with which Fig. 24 corresponds. In this case the shaft 33 of the embodiment illustrated in Fig. 5 is replaced by two shafts 166 and 167 respectively which may be connected and disconnected through the medium of a clutch 168. The shaft 166 carries the gear 32; and the shaft 167 has provision at 169 for attachment of the crank 37 (not shown). The clutch 168 has an element 171 fixed to the shaft 167, and a second element 172 slidably attached to the shaft 166, the latter element having a circumferential channel 173 which receives a clutch actuating lever 174. This lever is pivotally mounted at 175 to a fixed part of the machine, and its upper end is connected to the plunger 176 of a solenoid 177. The solenoid is connected in the electrical circuit shown in Figs. 17 to 21 in lieu of or in parallel with the signal lamp 163 so that the solenoid will be actuated to disengage the clutch 168 under the same conditions described above which result in the energization of the said signal lamp. Disengagement of the clutch 168 disconnects the shafts 166 and 167 and automatically interrupts actuation of the gear 32 at the point where the work piece has reached the required position in its traverse over the one ordinate. Movement in the other ordinate may be similarly controlled by a solenoid actuated clutch associated with the other indexing unit. It will be apparent that in a broad sense the solenoid actuated clutch functions in the same respect as the signal lamp to define the limit of the traverse movement which establishes the work in the required position, and the term "traverse-defining means" as used in the claims is intended to embrace both characters of device.

As described above, the indexing device is employed to locate the work pieces and tools relatively for the desired operation or operations. It will be apparent, however, that with the same procedure the device may be used to mark on the work, by means for example of a center drill, the centers on which the desired drilling or other operations are to be performed, the work piece then being removed to another machine or location for performance of the said operations.

I claim:

1. In indexing means for machine tools of the type comprising a work-support and a tool element and means for relatively traversing said support and element, a mobile record carrier operatively connected to said traversing means for synchronized operation with the latter, and record-actuated traverse-defining means operatively associated with said carrier and responsive to movements of the latter.

2. Indexing means according to claim 1 including an actuator for the traversing means and wherein the record carrier is geared to the said actuator so as to move in timed relation to the latter.

3. Indexing means according to claim 2 wherein the actuator for the traversing means is in the form of a lead screw.

4. Indexing means according to claim 3 wherein support is mobile and the lead screw is operatively connected to said support.

5. Indexing means according to claim 4 wherein the work support is mounted upon a mobile carriage for movement on the latter in a direction at right angles to the direction of movement of the carriage, the said support and carriage having separate traversing means, and wherein one of the record carriers with its associated record-actuated traverse defining means is associated with each of said traversing means.

6. Indexing means according to claim 1 wherein the said carrier comprises a plurality of separate record-carrying elements geared together for simultaneous operation at differing rates of speed.

7. Indexing means according to claim 6 wherein the record actuated means comprises a separate record-engaging element for each carrier, together with mechanisms for bringing said elements successively into operative positions with respect to records mounted on their respective carriers.

8. Indexing means according to claim 7 including a record-actuated signalling means associated with each of the record-engaging elements.

9. Indexing means according to claim 8 wherein the signalling means includes an electric circuit and a micro switch controlling said circuit and operatively connected to the record engaging element.

10. Indexing means according to claim 1 wherein the traverse-defining means comprises a record-engaging element and an electric signalling circuit including a micro switch for control of said circuit operatively connected to said element.

11. Indexing means according to claim 10 wherein the said switch is supported on a mobile record-supported carriage, the point of said support lying in close proximity to the point of contact with the record of the said record-engaging element whereby movements of the element, due to irregularities in surface contour of the record, will be accompanied by corresponding movements of the switch.

12. Indexing means according to claim 1 wherein the traverse-defining means comprises a record-actuated indicating device.

13. In indexing means for machine tools of the type comprising means for relatively traversing the work and tool element, a rotary record carrier operatively connected to said traversing means for synchronized operation with the latter, and record-actuated traverse-defining means operatively associated with said carrier and responsive to movements of the latter.

14. Indexing means according to claim 13 wherein the record-actuated traverse-defining means is adjustable axially of the rotary carrier.

15. Indexing means according to claim 13 including a cylindrical record mounted detachably on said carrier coaxially with the latter.

16. Indexing means according to claim 15 wherein the record-actuated traverse-defining means is adjustable axially of the carrier for engagement with different axially spaced circumferential portions of the record.

17. Indexing means according to claim 16 wherein the said record-actuated means is normally resiliently held in contact with the surface of the record.

18. Indexing means according to claim 17 wherein the mechanism for adjusting the record-actuated means axially of the carrier includes automatic means for elevating the said record-actuated means from contact with the record as an initial step in the adjustment operation.

19. In indexing means for machine tools of the type comprising means for relatively traversing the work and tool element, a rotary record carrier operatively connected to said traversing means for synchronized operation with the latter, a cylindrical record detachably mounted on said carrier coaxially with the latter, record actuated traverse-defining means normally resiliently held in contact with the surface of said record, and manual means for elevating the record actuating means out of contact with the record.

20. Indexing means according to claim 1 wherein the said carrier comprises a plurality of separate rotary record-carrying elements arranged with axes parallel to each other and connected for simultaneous operation at differing rates of speed.

21. Indexing means according to claim 20 wherein the record actuated means comprises a separate record-engaging element for each carrier element, together with means for bringing said engaging elements one at a time and selectively into contact with the respective records.

22. Indexing means according to claim 21 wherein the record-engaging elements are supported upon opposite ends of a common structure pivotally mounted at a point intermediate the carrier elements and between the said record engaging elements.

23. Indexing means according to claim 22 wherein the said common supporting structure is adjustable upon its pivotal mounting axially of the carrier elements.

24. Indexing means according to claim 23 wherein the pivotal mounting for the common support structure is in the form of a knife edge, and wherein further the knife edge structure is mounted for rocking adjustment about an axis paralleling said edge.

25. In a machine tool of the type comprising means for relatively traversing the work and tool element, a mobile record carrier operatively connected to said traversing means for synchronized operation with the latter, and record-actuated traverse-defining means operatively associated with said carrier and responsive to movements of the latter.

26. In a machine tool of the type comprising mechanism for relatively traversing the work and tool element to bring said work and element into correlated positions for a predetermined machine operation, the combination with said traverse mechanism of means for defining the extent of the traverse movement required to locate the said work and tool element in said correlated positions.

27. A machine tool according to claim 26 wherein the traverse-defining means includes a preformed record bearing a predetermined traverse pattern.

28. A machine tool according to claim 27 including means for actuating the record in synchronism with the traverse mechanism.

29. A machine tool according to claim 28 wherein the traverse-defining means comprises devices actuated by the record at the limit of the traverse movement wherein the work and tool element occupy the said correlated positions.

30. A machine tool according to claim 29 wherein the record-actuated devices comprise means for controlling the operation of the traverse mechanism.

31. In a machine tool of the type comprising mechanism for relatively traversing the work and tool element to bring said work and element into correlated positions for a predetermined machine operation, the combination with said traverse mechanism of means for defining the extent of the traverse movement required to locate the said work and tool element in said correlated positions, said traverse-defining means including a preformed record bearing a predetermined traverse pattern, means for actuating the record in synchronism with the traverse mechanism, and signal means actuated by the record at the limit of the traverse movement wherein the work and tool element occupy the said correlated positions.

32. A machine tool according to claim 26 wherein the traverse mechanism comprises independent means for relatively traversing the work and tool element on intersecting ordinates, and wherein means is provided for defining the said extent of traverse movement along each of said ordinates.

33. A machine tool according to claim 32 wherein each of the independent traverse means includes a preformed record bearing a predetermined traverse pattern, means for actuating the record in synchronism with the immediately associated traverse means, and devices actuated by the record at the limit of the traverse movement on the related ordinate.

34. In indexing means for machine tools of the type comprising means for relatively traversing the work and tool element, a mobile record carrier operatively connected to said traversing means for synchronized operation with the latter, and record-actuated traverse-control means operatively associated with said carrier and responsive to movements of the latter.

GEORGE H. BENZON, JR.

REFERENCES CITED

The following references are of record in the file of this patent:

UNITED STATES PATENTS

| Number | Name | Date |
|---|---|---|
| 776,212 | Anthony | Nov. 29, 1904 |
| 1,111,033 | Powers | Sept. 22, 1914 |
| 1,217,572 | Craley | Feb. 27, 1917 |
| 1,416,594 | Atherton | May 16, 1922 |
| 1,739,465 | Jorgensen | Dec. 10, 1929 |
| 1,942,209 | Graves et al. | Jan. 2, 1934 |
| 2,020,868 | Barnes et al. | Nov. 12, 1935 |
| 2,167,189 | Verderber | July 25, 1939 |
| 2,319,480 | Saving et al. | May 18, 1943 |
| 2,469,269 | Lear | May 3, 1949 |
| 2,479,975 | Shively | Aug. 23, 1949 |